Nov. 9, 1965  G. H. McLAFFERTY  3,217,190
SPIRAL MAGNETOHYDRODYNAMIC GENERATOR
Filed Oct. 3, 1961

INVENTOR
GEORGE H. McLAFFERTY
BY Leonard F. Wekulind
ATTORNEY

United States Patent Office 3,217,190
Patented Nov. 9, 1965

3,217,190
SPIRAL MAGNETOHYDRODYNAMIC
GENERATOR
George H. McLafferty, Manchester, Hartford, Conn., assignor to United Aircraft Corporation, East Hartford, Conn., a corporation of Delaware
Filed Oct. 3, 1961, Ser. No. 142,602
5 Claims. (Cl. 310—11)

This invention relates to magnetohydrodynamic generators and more particularly to generators having a spiral flow in which the variation of tangential velocity and radial electric current with radius, can be controlled.

The current of development of magnetohydrodynamic generators requires extremely long ducts in order to extract as much electrical energy as possible. The size, cost, and weight of such arrangements is oftentimes prohibitive and has been a great deterrent in the adaptation of power generators of this type.

Because of this, spiral arrangements have been restored to in an attempt to arrive at a more compact structure. Although a conventional spiral magnetohydrodynamic generator is more compact than a conventional linear magnetohydrodynamic generator (which incidentally may reach lengths of several hundred feet), the gas volume that the spiral device requires is much greater than that in a linear device because of the lack of control of the variation of tangential velocity and radial electric current with respect to the radius in the device.

Magnetohydrodynamic devices which include an involute type partition also become impractical because the flow for example may be required to make as many as 14 circuits in spiraling inwardly to achieve any degree of efficiency.

It is, therefore, an object of this invention to provide a spiral magnetohydrodynamic generator which has substantially concentric partitions with means for accelerating the working fluid as it passes through each stage or partition.

Another object of this invention is to provide a magnetohydrodynamic generator of the type described wherein the variation of radial electric current can be controlled so as to obtain maximum efficiency in all regions of the device.

These and other objects of this invention will become readily apparent from the following detailed description of the drawing in which.

Figure 1:
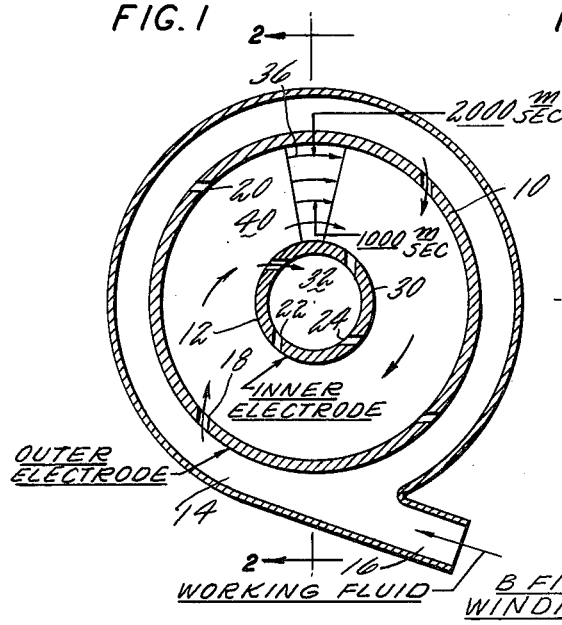
FIG. 1 is a schematic illustration in section of a conventional spiral magnetohydrodynamic generator taken along lines 1—1 of FIG. 2.
Figure 2:
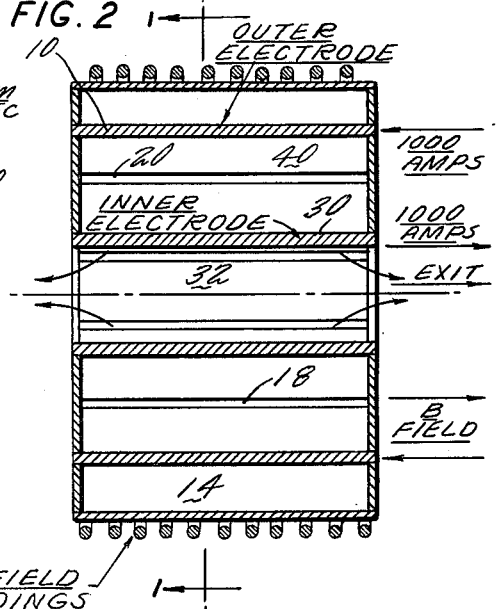
FIG. 2 is a schematic illustration in section of a conventional spiral magnetohydrodynamic generator taken along lines 2—2 of FIG. 1.

As seen in FIGS. 1 and 2, the ordinary spiral magnetohydrodynamic generator comprises an outer electrode 10 and an inner electrode 12. A manifold 14 may be provided which receives a working fluid from an inlet 16. Working fluid may be heated in any desirable manner to attain the desired temperature. The heating may be done upstream of the inlet 16 or the heating may be done within the generator itself. Thus, for example, the heating may be accomplished by a nuclear reaction in which the magnetohydrodynamic generator casing would act as a moderator and in which the fissionable materials would be included in the working fluid. Examples of devices of this sort as far as the heating and pumping are concerned are described in patent application Serial No. 44,601, for Nuclear Magnetohydroelectric Generator, filed July 22, 1960 by George H. McLafferty and patent application Serial No. 79,405, for Magnetogasdynamic Electric Generator, filed December 29, 1960 by John Conrad Crown et al.

The manifold 14 (FIGS. 1 and 2) conducts working fluid through passages 18 and 20 in the outer electrode 10 and the fluid then spirals inwardly and flows through passages 22 and 24 of the inner electrode 30. The fluid then flows through a suitable exhaust passage 32 arranged along the axis of the duct. The superimposed pattern 36 in FIG. 1 indicates generally the variation of tangential velocity with radius. Thus, at the outer periphery of the main circulating chamber 40, the working fluid velocity may be in the order of 2,000 meters per second. This flow velocity is reduced to approximately 1,000 meters per second at the inward radial portion of the duct 40 adjacent the inner electrode 30. As seen in FIG. 2, the electric current flow at the outer electrode is approximately 1,000 amperes and that in the inner electrode is also about 1,000 amperes.

The electric power obtained from the device is limited because the tangential velocity has been changed only once from 2,000 to 1,000 meters per second. In addition, since total radial current is constant, the reduced radius at the inner electrode will make the current density greater than is desirable for maximum efficiency.

Figure 3:
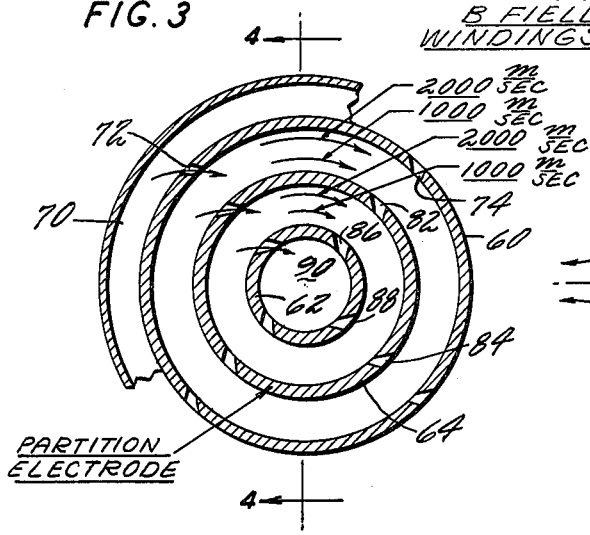
FIG. 3 is a schematic illustration in section of a spiral magnetohydrodynamic partitioned generator according to this invention taken along lines 3—3 of FIG. 4.
Figure 4:
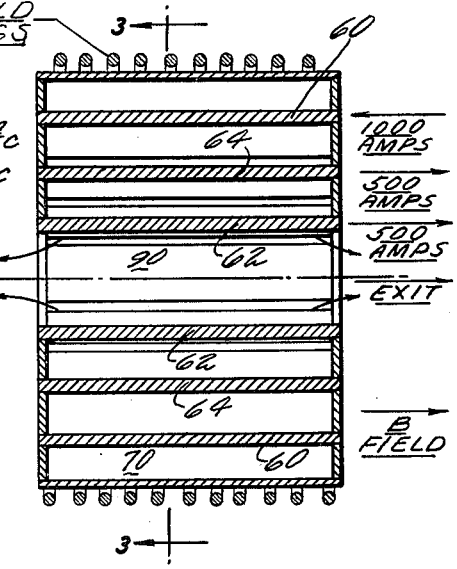
FIG. 4 is a schematic illustration in section of a spiral magnetohydrodynamic partitioned generator according to this invention taken along lines 4—4 of FIG. 3.

The device according to this invention is schematically shown in FIGS. 3 and 4 where an outer electrode 60 is provided and an inner electrode 62 is arranged in much the same manner as the FIGS. 1 and 2 showings. At least one additional partitioning device 64 is provided so that the walls or electrodes are concentrically arranged about the axis of rotation of the fluid which passes through a number of accelerating ports 72 and 74 in the outer casing or electrode 60. These accelerating passages 72 and 74 are convergent so as to increase the velocity to the desired level. As seen in FIG. 3, the velocity may drop from 2,000 meters per second to 1,000 per second as it aproaches the intermediate partition 64. At this point the flow will be further accelerated through passages 82 and 84 so that its velocity is increased again to approximately 2,000 meters per second. This velocity again drops to about 1,000 meters per second as it approaches the inner electrode 62 whereby it flows through passages 86 and 8 through the exit duct 90.

Since the velocity has been reduced from 2,000 to 1,000 meters per second twice in the device in FIGS. 3 and 4, the power extracted is greater than in the device in FIGS. 1 and 2. The ohmic losses are proportioned to the square of the current density (amperes/square meter). Where the current remains high at the reduced radius position in the vortex the current density necessarily rises. It therefore is desirable to reduce the current at the smaller radii to minimize current density rise and the ohmic losses.

As seen in FIG. 4, the intermediate partition 64 can be used as an electrode to "bleed off" electric current therethrough. Thus, the radial current is reduced from 1,000 to 500 amperes in the second stage. Thus, the increase in radial current density at low radii which would lead to inefficiencies in the device in FIGS. 1 and 2 is avoided in the device in FIGS. 3 and 4.

By analogy, this invention can be compared to the use of several stages in a turbine wherein the flow is accelerated in the interstage blading so as to extract the maximum amount of energy from the working fluid with the greatest efficiency.

As a result of this invention a highly efficient and compact magnetohydrodynamic generator has been provided which not only reduces the current densities at low radii and results in an increase in efficiency but also greatly reduces the cost of such devices by reducing the weight and size thereof.

Although only one embodiment of this invention has been illustrated and described herein, it will be apparent that various changes may be made in the construction and arrangement of the various parts without departing from the scope of this novel concept.

What it is desired by Letters Patent is:

1. A magnetohydrodynamic generator including a casing having a first annular wall forming curved fluid confining path, said wall including an outer electrode, means for introducing a working fluid into said path substantially tangentially of said wall, a second annular wall spaced inwardly from said first wall and including an inner electrode, means in said second wall receiving working fluid flowing from said first wall, and an annular partition between said first and second walls for dividing the annular path betwen said first and second walls including openings providing communication between the divided portions of said path, and means for accelerating the flow between said divided portions.

2. An MHD generator according to claim 1 wherein said openings include converging side walls to provide acceleration of the flow.

3. An MHD generator according to claim 1 wherein said openings have axes which are substantially tangential to said annular partition.

4. An MHD generator according to claim 3 wherein said walls and said partition are concentric.

5. An MHD generator according to claim 1 including means for bleeding current from said device at a radial position intermediate said first and second walls.

References Cited by the Examiner
UNITED STATES PATENTS

| | | | |
|---|---|---|---|
| 1,443,091 | 1/23 | Petersen | 310—11 |
| 2,982,214 | 5/61 | Cochran | 310—11 X |

ORIS L. RADER, *Primary Examiner.*

MILTON O. HIRSHFIELD, *Examiner.*